United States Patent
Schwindt (10) Patent No.: US 11,837,099 B2
(45) Date of Patent: Dec. 5, 2023

(54) AIRCRAFT FLIGHT MANAGEMENT SYSTEM

(71) Applicant: GE Aviation Systems Limited, Cheltenham (GB)

(72) Inventor: Stefan Alexander Schwindt, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 676 days.

(21) Appl. No.: 16/692,242

(22) Filed: Nov. 22, 2019

(65) Prior Publication Data

US 2021/0158709 A1    May 27, 2021

(51) Int. Cl.
| | |
|---|---|
| B64C 9/02 | (2006.01) |
| B64D 31/00 | (2006.01) |
| B64D 43/02 | (2006.01) |
| G08G 5/00 | (2006.01) |
| G05D 1/10 | (2006.01) |

(52) U.S. Cl.
CPC ............ *G08G 5/0065* (2013.01); *B64C 9/02* (2013.01); *B64D 31/00* (2013.01); *B64D 43/02* (2013.01); *G05D 1/101* (2013.01)

(58) Field of Classification Search
CPC .. B64C 9/00; B64C 9/02; B64D 31/00; B64D 43/00; B64D 43/02; G05D 1/00; G05D 1/10; G05D 1/101; G08G 5/00; G08G 5/0017; G08G 5/0021; G08G 5/0047; G08G 5/0065; G08G 5/0073
See application file for complete search history.

(56) References Cited

U.S. PATENT DOCUMENTS

| | | | |
|---|---|---|---|
| 9,132,912 | B2 | 9/2015 | Griffith et al. |
| 9,696,724 | B1 | 7/2017 | Arons et al. |
| 10,202,204 | B1 | 2/2019 | Daidzic |
| 10,228,702 | B2 | 3/2019 | Demortier et al. |
| 10,293,951 | B2 | 5/2019 | Feulner et al. |
| 2018/0067500 | A1 | 3/2018 | Kim et al. |
| 2018/0088593 | A1 | 3/2018 | De Tarso Ferreira et al. |
| 2018/0354636 | A1 | 12/2018 | Darnell et al. |
| 2019/0072982 | A1 | 3/2019 | Guedes et al. |
| 2019/0354644 | A1* | 11/2019 | Orhan .................... B64D 45/00 |

FOREIGN PATENT DOCUMENTS

CN    105096663 A    11/2015

* cited by examiner

*Primary Examiner* — Charles J Han
(74) *Attorney, Agent, or Firm* — McGarry Bair PC (57) ABSTRACT

An apparatus and method for an aircraft flight management system configured to analyze a takeoff sequence for an aircraft, the aircraft slight management system comprising a memory storing runway information associated with the runway from which the aircraft will depart, one or more inputs configured to receive variables comprising real-time aircraft variables and real-time condition variables that influence an actual velocity of the aircraft, sensors for sensing the actual velocity of the aircraft; and a processor configured to compare a real-time takeoff value to a takeoff requirement value.

17 Claims, 5 Drawing Sheets

AIRCRAFT FLIGHT MANAGEMENT SYSTEM

TECHNICAL FIELD

The disclosure generally relates to aircraft flight management and, more particularly, relates to a system for analyzing a takeoff sequence for an aircraft during departure.

BACKGROUND

Aircraft are commonly equipped with a flight management system (FMS) for managing aircraft flight control, generating flight profile data, and providing navigational information such as flight paths designated by waypoints that are represented by navigational location coordinates. Additionally, flight management control systems are also configurable to provide aircraft engine throttle settings for manual or automatic control of the engine thrust. During aircraft takeoff, a flight management system can determine engine thrust requirements to sufficiently elevate the plane on lift off from the runway such that the aircraft sufficiently climbs at a pitch rate, typically according to a programmed schedule or requirements set forth by the air traffic control.

BRIEF DESCRIPTION

In one aspect, the disclosure relates to a method of real-time analyzing, with a flight management systems (FMS) of an aircraft, a takeoff sequence of the aircraft on a predetermined runway, the method comprising: receiving at the FMS, from sensors on the aircraft, real-time data corresponding to at least one variable influencing a takeoff reference velocity of the aircraft during the takeoff sequence; receiving at the FMS, from sensors on the aircraft, real-time data of a actual velocity and a real-time acceleration; estimating, with the FMS, a final estimated velocity based on the actual velocity and the real-time acceleration; comparing, with the FMS, the final estimated velocity to the takeoff reference velocity to determine if the final estimated velocity is within a predetermined range of the takeoff reference velocity; and altering, with the FMS, at least one operational variable of the aircraft when the comparing indicates the final estimated velocity is not within the predetermined range.

In another aspect, the disclosure relates to an aircraft flight management system configured to analyze a takeoff sequence for an aircraft, the aircraft flight management system comprising: memory storing runway information associated with the runway from which the aircraft will depart; one or more inputs configured to receive variables comprising real-time aircraft variables and real-time condition variables that influence an actual velocity of the aircraft; sensors for sensing the actual velocity of the aircraft; and a processor configured to calculate a takeoff reference velocity associated with the runway information, the real-time aircraft variables, and the real-time condition variables, calculate a real-time takeoff value associated with the actual velocity and the runway information, calculate a takeoff requirement value associated with the takeoff reference velocity; and compare the real-time takeoff value to the takeoff requirement value.

DETAILED DESCRIPTION

Aspects of the disclosure described herein are broadly directed to a method and apparatus for analyzing a takeoff sequence for an aircraft. For the purposes of illustration, one exemplary environment within which the takeoff sequence can be controlled will be described in the form of an aircraft management system. Such an aircraft management system can include a controller, processor, and memory. It will be understood, however, that aspects of the disclosure described herein are not so limited and can have general applicability within other aircraft systems.

The takeoff sequence for an aircraft must factor in numerous variables, including but not limited to pressure altitude, wind, temperature, slip coefficient of the runway, and other weather and/or environmental factors. Variables associated with the aircraft, including but not limited to weight and balance should also be considered. Additionally other variables with respect to the runway, direction, incline, and length, also need to be factored into the takeoff sequence. It is vital to aircraft safety that the takeoff sequence considers all relevant factors and in the event problems are detected, enables the pilot to abort the takeoff sequence.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

Additionally, as used herein, a "controller" or "controller module" can include a component configured or adapted to provide instruction, control, operation, or any form of communication for operable components to effect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient, volatile or non-transient, or non-volatile memory. Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein.

Additionally, as used herein, elements being "electrically connected," "electrically coupled," or "in signal communication" can include an electric transmission or signal being sent, received, or communicated to or from such connected or coupled elements. Furthermore, such electrical connections or couplings can include a wired or wireless connection, or a combination thereof.

Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor as defined above, and the controller module or processor can perform processing on the value to determine a representative value or an electrical characteristic representative of said value.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
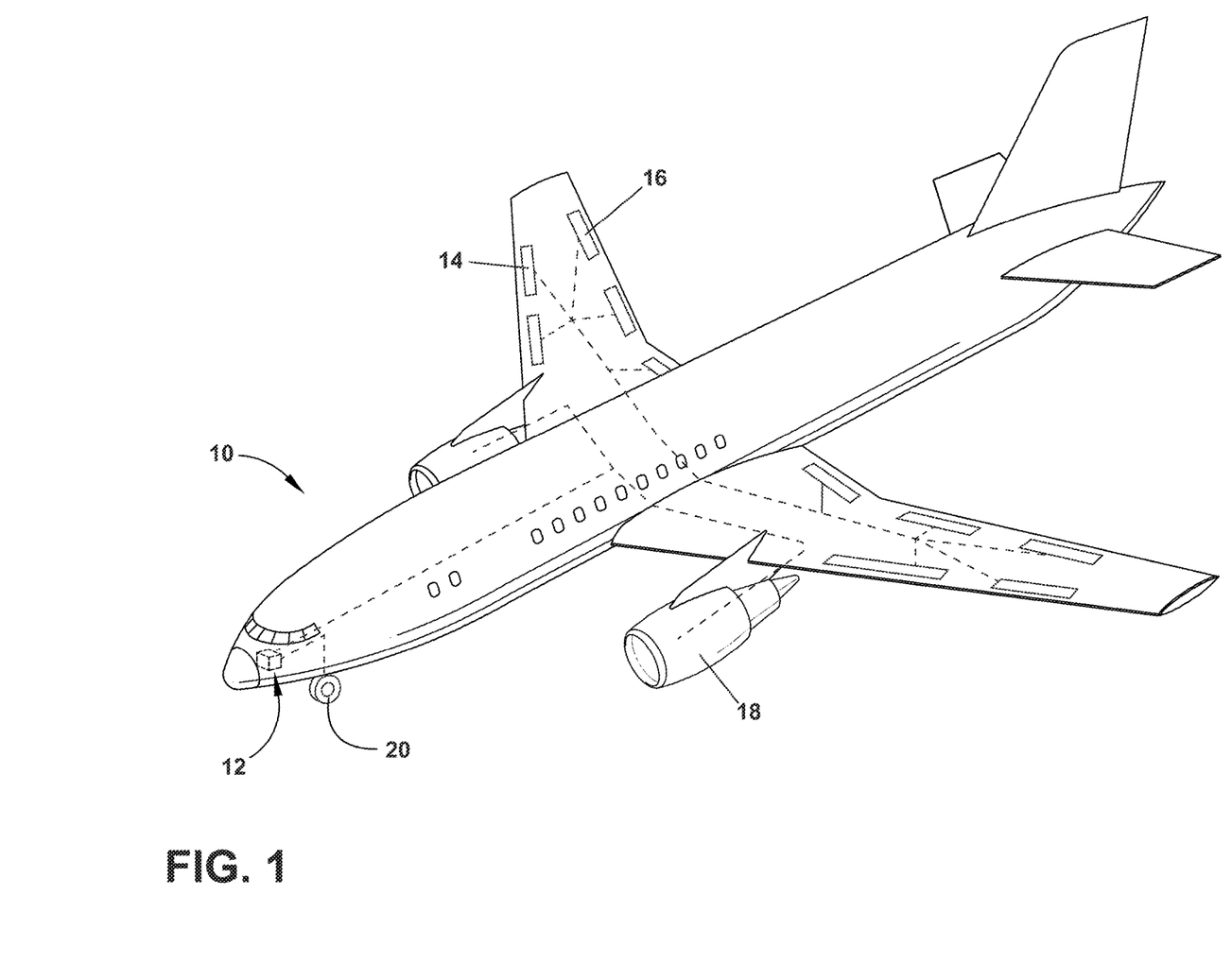
FIG. 1 is a perspective view of an exemplary aircraft with a flight management system.
Figure 2:
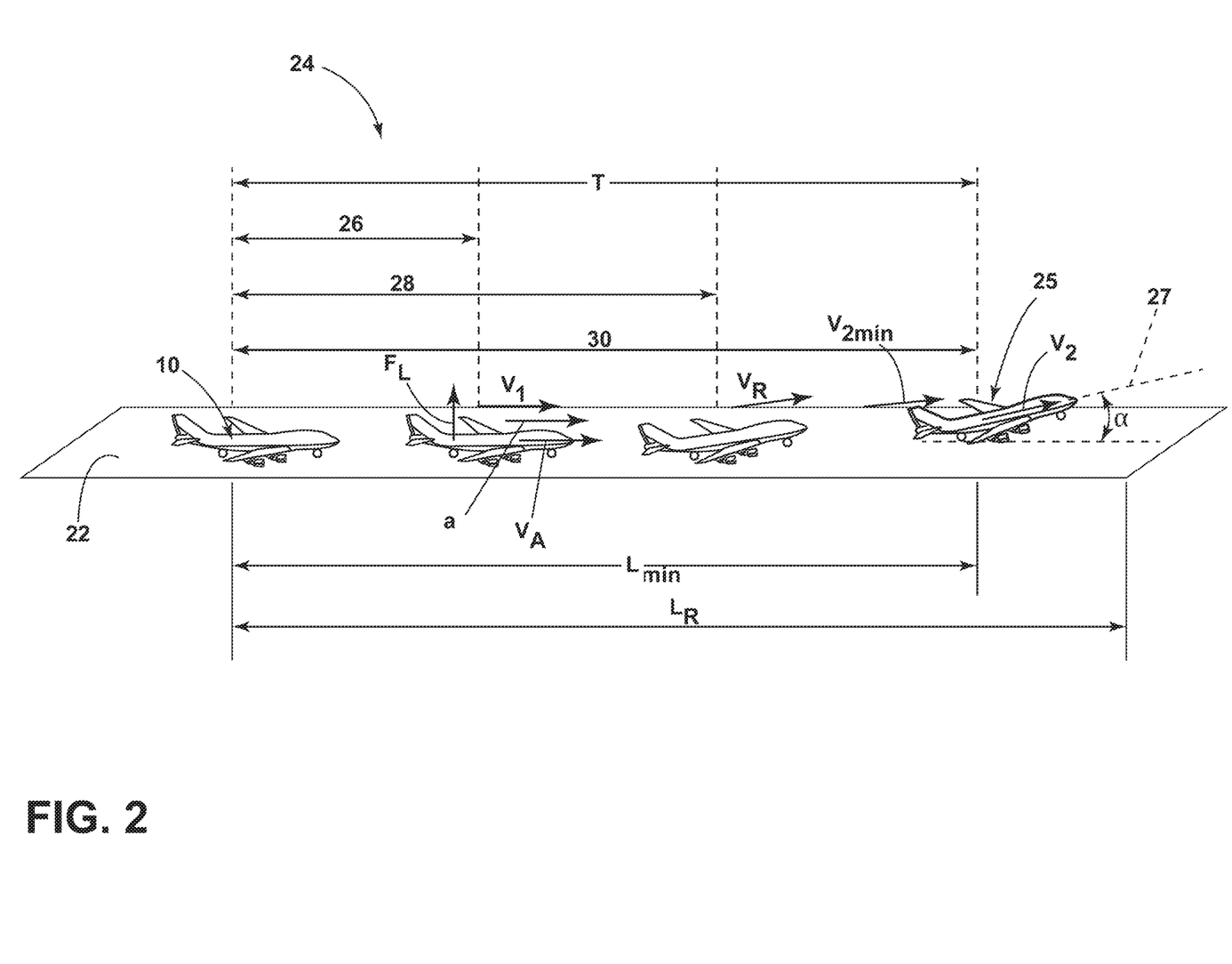
FIG. 2 is a schematic diagram of a takeoff sequence for the aircraft of FIG. 1.

FIG. 1 schematically illustrates an aircraft 10 including an aircraft flight management system (FMS) 12 for operating various aspects associated with the flight of the aircraft 10 including a takeoff sequence 24 (FIG. 2). The aircraft 10 can include, but is not limited to, slats 14, flaps 16, engines 18, and landing gear 20, all of which contribute to the takeoff sequence 24. The FMS 12 can be electronically coupled as illustrated in phantom to each of the slats 14, flaps 16, engines 18, and landing gear 20 in any suitable manner, including hardwired or wirelessly. The aircraft 10 can be a jet propelled and propeller driven aircraft, as are commonly employed throughout the aircraft industry.

Referring to FIG. 2, the departure of the aircraft 10 from an airport runway 22 is generally illustrated according to the takeoff sequence 24. During takeoff or departure from the airport runway 22, the aircraft 10 accelerates with an acceleration (a), the acceleration can be at full power, or a derated thrust, with the aircraft flaps 16 set in a takeoff position to promote a lift ($F_L$) to enable the aircraft lift off from the runway at an initial climb rate (pitch rate) along a path 27 and climb angle α. The aircraft flap 16 position is dependent on conditions making a small range of flap positions allowable for takeoff. More flaps can get the aircraft in the air sooner as more lift ($F_L$) is generated but then the climb angle α will be shallower due to higher drag and lower excess thrust. A full flap position is typically not an option for takeoff as the extra lift ($F_L$) added does not compensate for extra drag generated. The aircraft climb rate can vary depending upon size and weight of the aircraft, engine thrust, and atmospheric conditions such as temperature, wind, and other variables.

The aircraft takeoff sequence 24 can occur over the course of a total takeoff time period (T) which can include an initial time period 26, an activate rotation time period 28, and finally a takeoff time period 30. The acceleration (a) and the lift ($F_L$) of the aircraft 10 can change or remain constant during the takeoff sequence 24. An actual velocity ($v_A$) can be determined at any given time during the takeoff sequence 24 utilizing known methods described herein and is dependent on the acceleration (a) and the lift ($F_L$). The actual velocity ($v_A$) can also be referred to as a real-time velocity, or the velocity of the aircraft 10 in real time.

A takeoff reference velocity 25 associated with the takeoff time period (T), the airport runway 22, and the aircraft 10 itself can be determined based on several factors described herein. While it is possible for the takeoff reference velocity 25 to be equal to the actual velocity ($v_A$), it should be understood that the takeoff reference velocity 25 is associated with a calculated velocity based on variables received at the FMS 12, while the actual velocity ($v_A$) is an actual velocity of the aircraft during the takeoff sequence 24.

The takeoff reference velocity 25 can be determined for each of the initial time period 26, activate rotation time period 28, and the takeoff time period 30. The takeoff reference velocity 25 associated with the initial time period 26 can be a decision velocity ($v_1$), the velocity at which the aircraft 10 can brake without overrunning the runway 22. The decision velocity ($v_1$) means the maximum speed during takeoff at which the pilot must take a first action (e.g. apply brakes, reduce thrust, deploy speed brakes) to stop the aircraft 10 without overrunning the runway 22. The initial time period 26 is defined as the length of time for the aircraft 10 to accelerate from a velocity of 0 m/s to the decision velocity ($v_1$).

Another takeoff reference velocity 25 associated with the activate rotation time period 28 can be a rotation velocity ($v_R$), the velocity at which a rotation of the aircraft 10 is initiated toward the path 27 along the angle α. The activate rotation time period 28 is defined as the length of time for the aircraft 10 to accelerate from 0 m/s to the rotation velocity ($v_R$).

The takeoff reference velocity 25 associated with the takeoff time period 30 can be a takeoff velocity ($v_2$), the velocity at which the aircraft 10 can take off with one engine 18 inoperative. In other words, the takeoff velocity ($v_2$) can refer to the minimum speed during takeoff, following a failure of one engine, at which the pilot can continue the take-off and achieve the required height above the take-off surface without overrunning the runway 22. It is further contemplated that a minimum takeoff velocity ($v_{2min}$) is a minimum takeoff safety speed, a velocity at which the aircraft 10 can take off safely with all engines 18 operating normally. The takeoff time period 30, is therefore defined as the length of time for the aircraft 10 to accelerate from 0 m/s to the takeoff velocity ($v_2$).

It is contemplated that the initial time period 26, activate rotation time period 28 and the takeoff time period 30 overlap to an extent. For example, the initial time period 26 that the aircraft 10 takes to reach the decision velocity ($v_1$) can be 9 seconds where the aircraft 10 can reach the takeoff velocity ($v_2$) in 7 seconds. In other words, in implementation an aircraft could take off from a long runway where even when it reaches the takeoff velocity ($v_2$), there is still sufficient length to apply the brakes and stop at the end of the runway. It is further contemplated that the takeoff velocity ($v_2$) and the rotation velocity ($v_R$), are the same making the activate rotation time period 28 and the takeoff time period 30 the same as well.

A minimum length ($L_{min}$) associated with the takeoff velocity ($v_2$) is illustrated as less than the runway length ($L_R$), though it is contemplated that the minimum length ($L_{min}$) is equal to the runway length ($L_R$). It should be understood that the minimum length ($L_{min}$) required to achieved each takeoff reference velocity 25 can be the same, or different depending on several variables described in more detail herein. By way of non-limiting example, the weather conditions can significantly change a slip coefficient (μ) between the runway 22 and the landing gear 20 which can increase the minimum length ($L_{min}$) required for the takeoff velocity ($v_2$).

Figure 3:
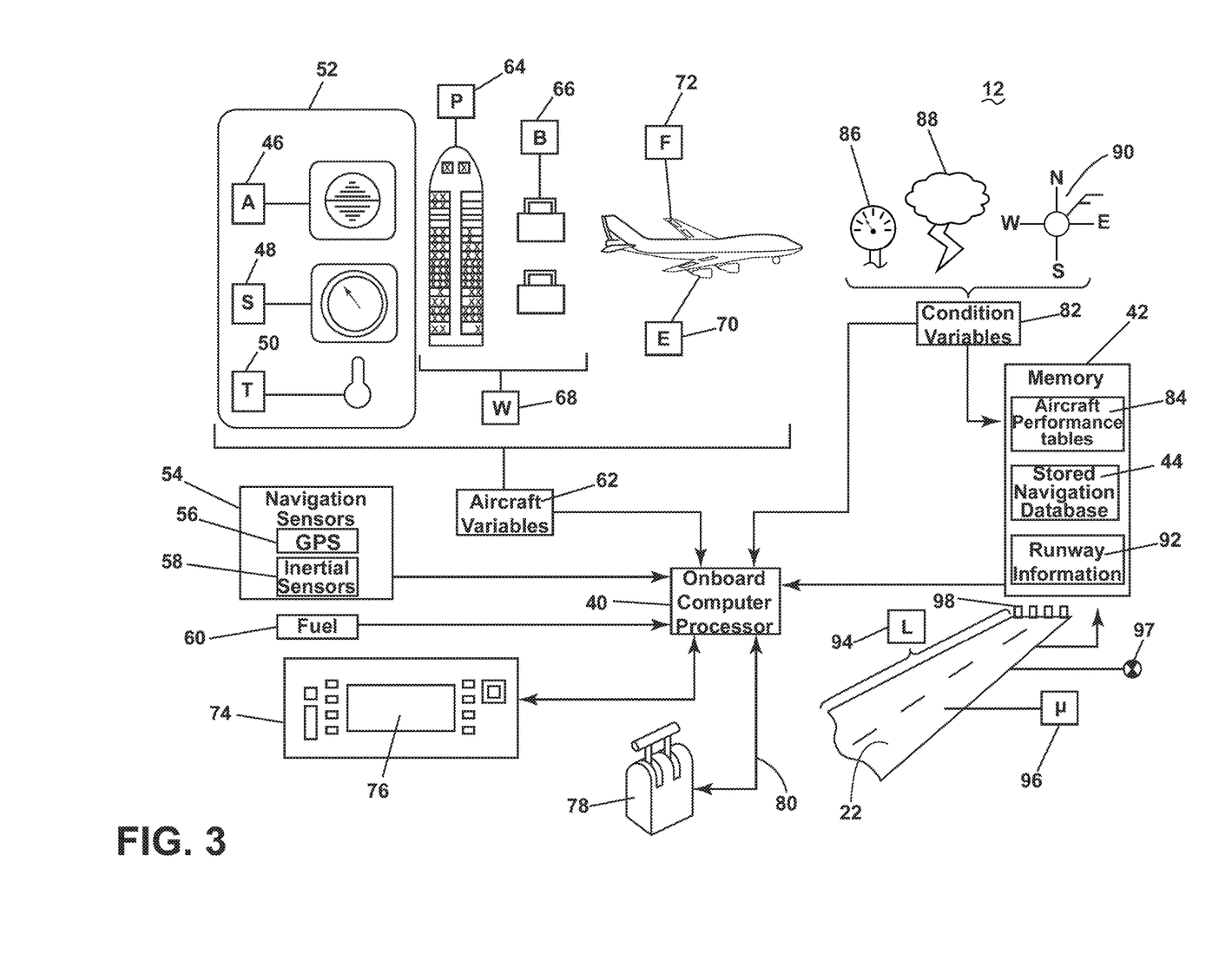
FIG. 3 is a schematic diagram of the flight management system for the aircraft of FIG. 1.

Turning to FIG. 3, an exemplary FMS 12 is illustrated in detail. The FMS 12 is configured to receive selected flight parameters to control the flight of the aircraft 10. The FMS 12 includes an FMS onboard computer processor 40 and a memory 42. The memory 42 includes a stored navigation database 44 that stores aircraft navigation information. The onboard computer processor 40 receives various inputs including sensed aircraft altitude 46, sensed aircraft speed 48, and sensed air temperature 50 from an air data computer 52. Additionally, the onboard computer processor 40 receives inputs from navigation sensors 54, such as location coordinates from a global positioning system (GPS) 56 and inertial data from inertial sensors 58. Further, the onboard computer processor 40 receives other inputs from other sensors such as fuel quantity 60, and other sensed variables known in the art.

The sensed aircraft altitude 46, sensed aircraft speed 48, and sensed air temperature 50 can all be generally referred to as real-time aircraft variables 62. Additional real-time aircraft variables 62 include passenger count 64 and baggage amount 66 which can together influence a total weight 68 of the aircraft. An engine status/thrust 70 and a flap orientation 72 can also be included in the real-time aircraft variables 62 that are received by the onboard computer processor 40.

The onboard computer processor 40 is further shown in communication with a control and display unit (CDU) 74 having a display 76. It should be appreciated that the CDU 74 can be a human machine interface that allows pilots to input data and to receive output data. For example, output data indicating computed parameter velocities 25 can be provided in display pages presented on the display 76 to allow a pilot of the aircraft to operate the aircraft pursuant to the output data provided by the FMS 12.

The FMS 12 is further shown to include a throttle control 78 for controlling the engine throttle, as should be evident to those skilled in the art. The throttle control 78 can be manually actuated by a pilot of the aircraft in a manual mode. In an automatic flight control mode, the throttle control 78 can be automatically controlled by an auto throttle signal 80 provided by the onboard computer processor 40. It should be appreciated that the onboard computer processor 40 can output command signals for controlling the aircraft with the computed throttle value by providing output commands via the display 76 or by automatically controlling the throttle control 78 via the auto throttle signal 80.

In operation, real-time condition variables 82 are received by the onboard computer processor 40. It is further contemplated that the real-time condition variables 82 can be stored in the memory 42, by way of non-limiting example in an aircraft performance table 84 for reference on similar or the same routes. The real-time condition variables 82 can include, but are not limited to, pressure 86, weather 88, and wind 90 conditions.

Runway information 92 is also a variable that can be stored in the memory 42 and updated. Runway information 92, can include, but is not limited to, length 94, the runway length ($L_R$) described herein, slip coefficient (μ) values 96 associated with various runways given the real-time condition variables 82, runway elevation 97 associated with the geographical location of the runway 22, and the presence of an Engineered Material Arresting System (EMAS) 98 that are crushable concrete blocks past the end of the runway 22 and used to catch aircraft with minimal damage.

The FMS 12 illustrated is a flight management system that can be configured to perform various aspects to control an aircraft during aircraft departure, cruising and arrival procedures. It should be appreciated that the memory 42 and the stored navigation database 44 can include an existing navigation database in an existing flight management system that is upgraded to perform the takeoff sequence 24 described herein.

Figure 4:
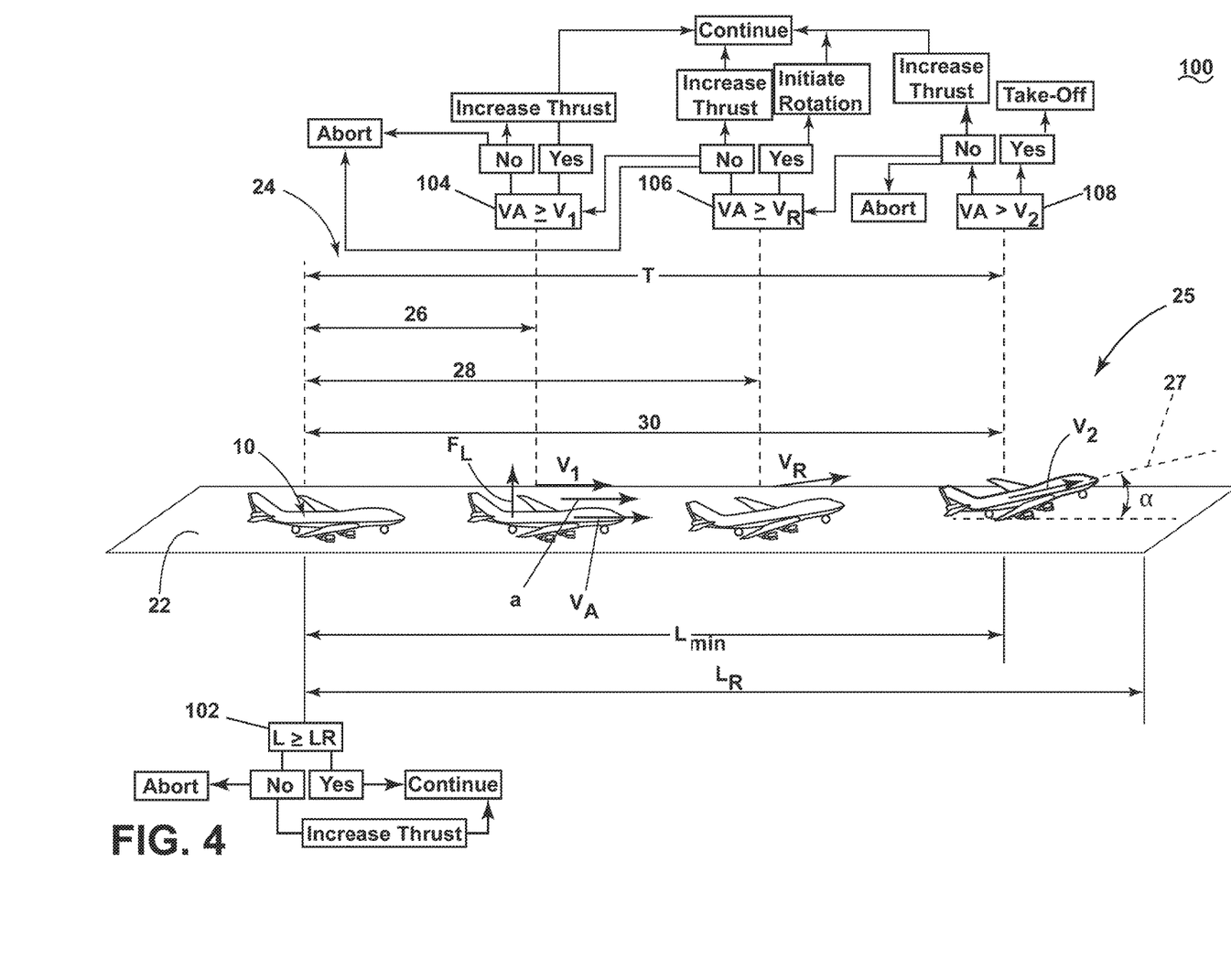
FIG. 4 is a schematic diagram of an exemplary takeoff sequence check processed by the flight management system of FIG. 3.

Turning to FIG. 4, an exemplary takeoff sequence check 100 processed by the FMS 12 is illustrated. Each of the checks described herein can result in a yes/no output. A yes output can always result in a continuation of the takeoff sequence 24 while a no output can result in a variety of processes including aborting the takeoff sequence 24. It should be understood that aborting the takeoff sequence 24 can occur manually. It is further contemplated that aborting the takeoff sequence can occur automatically as initiated by the FMS at any safe stage or as a configurable value, i.e. at a fixed velocity or at a percentage of $v_1$, $v_R$, or $v_2$. The FMS can be configured to radio the air traffic control (ATC) with a message that takeoff is aborted so that ATC can ensure no other aircraft use the runway.

At the beginning of the takeoff time period (T), an initial check 102 can occur to determine if ($L_{min} \geq L_R$). This initial check determines whether the aircraft 10 is capable of taking off from the runway 22 on which it is situated. While depicted as a check executed by the FMS 12, it should be understood that this can also be a check complete long before the aircraft even approaches the runway 22. Along with aborting the takeoff sequence 24 it is also contemplated that if the output is no, the thrust can increase, increasing acceleration (a), and the takeoff sequence 24 can continue. It should be understood that thrust calculations up to and including maximum thrust can be completed to determine if the takeoff sequence 24 can continue.

After the initial time period 26 is complete, an initial time period check 104 can occur to determine if ($v_A \geq v_1$), is the actual velocity ($v_A$) greater than or at least equal to the decision velocity ($v_1$) described herein. Again, it is contemplated that if no, the thrust can increase, and that thrust calculations up to and including maximum thrust can be completed to determine if the takeoff sequence 24 can continue. In the even the takeoff sequence can continue, increasing acceleration (a), and the takeoff sequence 24 continues.

After the activate rotation time period 28 is complete, a rotation time period check 106 can occur to determine if ($v_A \geq v_R$), is the actual velocity ($v_A$) greater than or at least equal to the rotation velocity ($v_R$) described herein. At this check, if no, the initial time period check 104 can be processed again. Also, if no, the thrust can increase, and that thrust calculations up to and including maximum thrust can be completed to determine if the takeoff sequence 24 can continue. If yes, the takeoff sequence 24 can be continued and the aircraft 10 can initiate rotation toward the climb angle α. It is further contemplated that increasing acceleration (a) can also occur, and the takeoff sequence 24 continues.

After the takeoff time period 30 is complete, a takeoff time period check 108 can occur to determine if ($v_A \geq v_2$), is the actual velocity ($v_A$) greater than or at least equal to the takeoff velocity ($v_2$) described herein. At this check, if no, the initial time period check 104 and/or the activate rotation time period check 106 can be recalculated or the takeoff sequence 24 can be aborted. It is also contemplated that if no, the thrust can increase, and that thrust calculations up to and including maximum thrust can be completed to determine if the takeoff sequence 24 can continue. At this particular point, rotation of the aircraft to the climb angle α in order to takeoff should be completed. If yes, the takeoff sequence 24 can be continued and the aircraft 10 can takeoff.

Figure 5:
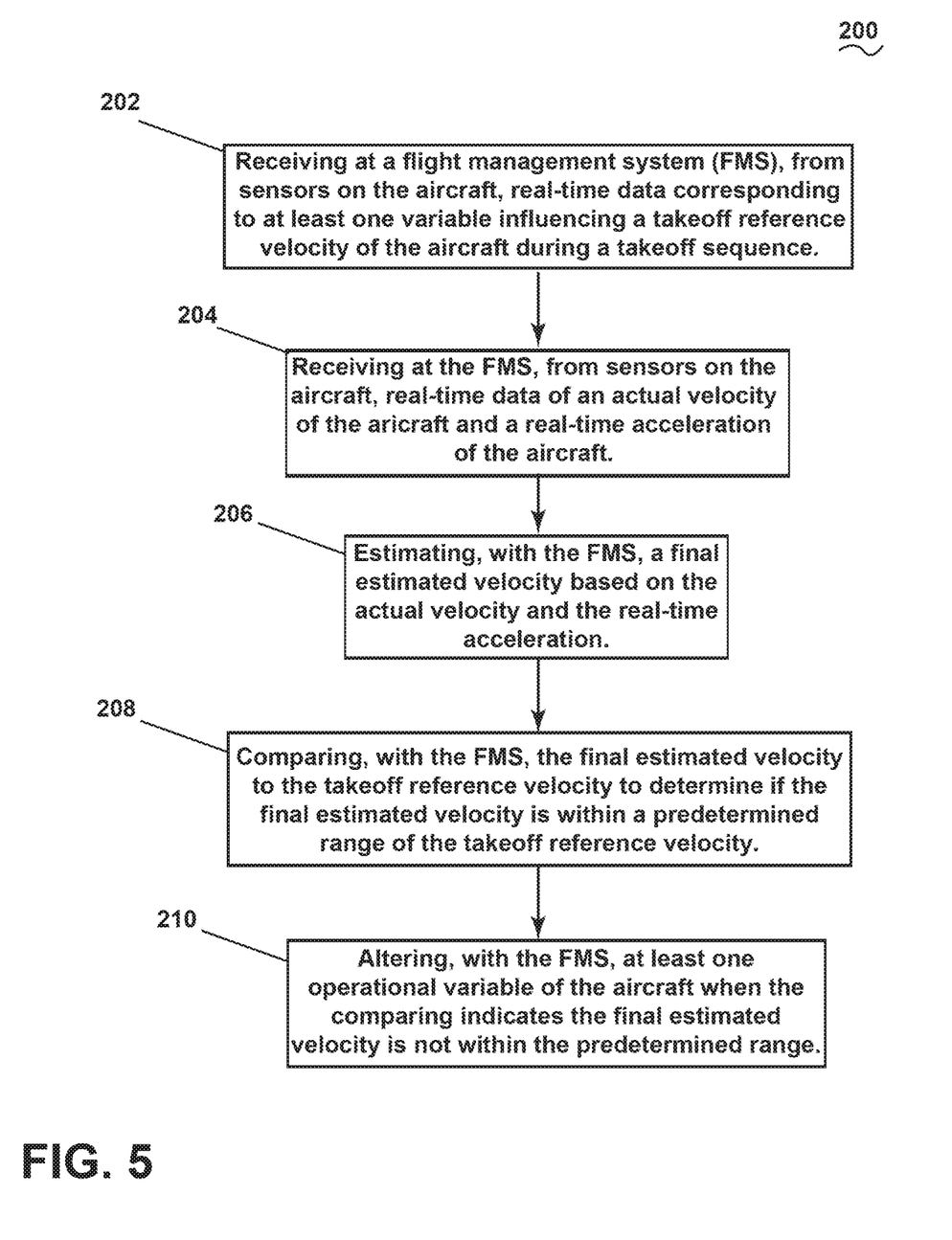
FIG. 5 is a flow chart for a method of analyzing the takeoff sequence of FIG. 2 according to an aspect of the disclosure herein.

FIG. 5 is a flow chart illustrating a method 200 of real-time analyzing, with the FMS, the takeoff sequence 24 for the aircraft 10 on a predetermined runway 22. It should be understood that runway information 92 associated with the runway 22 from which the aircraft 10 will depart can be received and stored at the memory 42 or directly input into the onboard computer processor 40 via the CDU 74.

At 202 the FMS receives real-time data corresponding to variables that influence the takeoff reference velocity 25 of the aircraft 10 during the takeoff sequence 24. The variables can be, by way of non-limiting example, the real-time aircraft variables 62 and real-time condition variables 82 described herein, and can be input manually via the CDU 74 or sensed and directly processed by the onboard computer processor 40, or stored in the memory 42. Calculating the takeoff reference velocity 25 associated with the received runway information 92 and the received variables 62, 82 can include determining the decision velocity ($v_1$), the rotation velocity ($v_R$), and/or the takeoff velocity ($v_2$) as described herein.

At 204 real-time data corresponding to the actual velocity ($v_A$) and acceleration (a) of the aircraft is received at the FMS 12. Upon initiating the takeoff sequence 24, the actual velocity ($v_A$) associated with a current speed of the aircraft 10 can be determined. The onboard computer processor 40 receives various inputs including the sensed aircraft speed 48 which can be utilized to determine the actual velocity ($v_A$).

It should be understood that receiving and calculating the information, variables, and/or takeoff reference velocities can include manually inputting, sensing, or any combination of manually inputting and sensing where the data collected is eventually processed by the onboard computer processor 40. Received and calculated information can change quickly in certain weather conditions. A benefit associated with the disclosure herein is that by using sensors, the aircraft determines actual data in real-time, avoiding any mistakes made when transferring or inputting of information. It should be understood that as described herein velocity includes both the speed and direction of the aircraft 10, and at any time the data received associated with the actual velocity ($v_A$) can be either one of a speed value or direction value or both. Data received associated with the takeoff reference velocity 25 can also be a speed value, direction value, both, or other pieces of information including but not limited to the aircraft and real-time condition variables.

A final estimated velocity ($v_f$) based on the actual velocity ($v_A$) and the acceleration (a) is estimated at 206. The final estimated velocity ($v_f$) can be any velocity occurring in the future of the takeoff sequence 24. By way of non-limiting example the final estimated velocity ($v_f$) can be a calculated value for the takeoff velocity ($v_2$) with which the aircraft will depart based on the actual velocity ($v_A$) and the additional variables received. It is further contemplated that the final estimated velocity ($v_f$) is a calculated value for the decision velocity ($v_1$) or the rotation velocity ($v_R$).

At 208 the final estimated velocity ($v_f$) is compared to the takeoff reference velocity 25 to determine if the final estimated velocity 25 is within a predetermined range of the takeoff reference velocity 25. The predetermined range is determined based on the aircraft 10 capabilities and can be different for different aircraft. It should be understood that the final estimated velocity ($v_f$) can be a calculated value based on real-time data collected while the takeoff reference velocity 25 can be a calculated value for what a value of the actual velocity should be at any given time based on the received variables. In other words, the final estimated velocity ($v_f$) is the most likely outcome for the aircraft 10 in real time while the takeoff reference velocity 25 is how the aircraft should operate based on the received variables. In this manner, when a takeoff sequence is undergoing a smooth execution, a comparison of the final estimated velocity ($v_f$) to the takeoff reference velocity 25 would indicate similar if not matching values. However in a scenario in which the final estimated velocity ($v_f$) is much different than the takeoff reference velocity 25, or outside the predetermined range, a pilot could be alerted and the takeoff sequence 24 could be aborted as previously described herein. Therefore at 210, in the event comparing indicates that the final estimated velocity ($v_f$) is not within the predetermined range, at least one operational variable is altered. By way of non-limiting example, altering at least one operational variable can include increasing thrust, adjusting a flap mounted to the aircraft, or adjusting a slat mounted to the aircraft. It is also contemplated that a signal that alerts the pilot to manually abort the takeoff can be sent to the display 76.

In the event the final estimated velocity ($v_f$) is within the predetermined range of the takeoff reference velocity 25 a signal that alerts the pilot that everything has checked out and the takeoff sequence 24 can continue can be sent to the display 76.

The method 200 can include aborting the takeoff sequence in an event where the actual velocity is outside the predetermined range of the takeoff reference velocity 25 as described in FIG. 4. The method 200 can further include recalculating the takeoff reference velocity 25 based on updated variables in an event where the actual velocity ($v_A$) is outside the predetermined range of the takeoff reference velocity. As previously described herein, upon recalculation, the method 200 can include increasing the thrust in an event where the recalculated takeoff reference velocity 25 indicates an increase in thrust will bring the actual velocity ($v_A$) within the predetermined range of the takeoff reference velocity 25. It is further contemplated that the method 200 can include monitoring the lift ($F_L$) during the takeoff sequence 24 and in an event where the recalculated takeoff reference velocity 25 indicates that adjusting the slat 14 or the flap 16 mounted to the aircraft 10 will bring the actual velocity ($v_A$) within the predetermined range of the takeoff reference velocity 25, adjusting the slats 14 and/or the flaps 16.

The method 200 as described herein can include calculating an optimal takeoff sequence based on the real-time aircraft variables 62, real-time condition variables 82, and runway information 92. The optimal takeoff sequence can include which combination of thrust 70, slat 14, and flap 16 settings provides optimal fuel 60 consumption and noise levels while retaining safety of takeoff within the runway length 94 and climb requirements associated with the airport from which the aircraft is departing.

The method 200 can further include verifying that the takeoff sequence is within a predetermined parameter associated with the optimal takeoff sequence. The predetermined parameter can be the reference velocities 25 described herein. Verification can occur by determining during the takeoff sequence 24 if the acceleration (a) values received during monitoring result in any one of the calculated decision velocity ($v_1$), rotation velocity ($v_R$), and/or the takeoff velocity ($v_2$) described herein. In an event where a weight 68 or slip coefficient (µ) has been miscalculated, the verification process can produce a signal or alert that the real-time takeoff sequence is not within the predetermined parameter associated with the optimal takeoff sequence.

If acceleration (a) is lower than a calculated acceleration required for the optimal takeoff sequence, a recalculation can occur to determined if the runway length ($L_R$) is sufficient with a current thrust. If so, recalculations based on the runway length ($L_R$) can occur. If not, more thrust can be applied and if with maximum thrust the actual velocity ($v_A$) cannot be reached ($v_A \geq v_1$) the takeoff sequence 24 is aborted. The recalculation can either be displayed to a pilot to input a new thrust and/or automatically applied, with or without the display 76 indicating an update.

Determining if the EMAS 98 is present on the runway 22 can also be a further consideration. Because many airports include the EMAS 98 and the FMS 12 could include an update that sends a query to an airport/navigation database regarding whether the airport has such a system. In the event the EMAS 98 is present, aborting takeoff can be allowed/suggested even after passing $v_1$ by a calculated amount in a situation where risking a usual takeoff and immediate landing procedure is less desirable than an intentional overrun of the runway.

The method 200 can include sending a signal to indicate when the actual velocity ($v_A$) is equal to the takeoff reference velocity 25. This signal could be in the form of automatically annunciating the actual velocity ($v_A$) when equal to any one of the takeoff reference velocities ($v_1$, $v_R$ and $v_2$). In two pilot operated aircraft, a monitoring pilot conducts calculations prior to takeoff and tracks speed and calls the speeds out to a flying pilot, i.e. "V1" when the aircraft has reached ($v_1$). The FMS 12 as described herein can automatically calculate and recalculate the takeoff reference velocities 25 and performs the monitoring by calling out the speeds. It is also contemplated that the speeds are displayed or called out or both. This feature would reduce workload for the monitoring pilot to concentrate on other tasks and could also enable future single pilot operations where the FMS 12 acts as the monitoring pilot.

It should be understood that any combination of the methods and check sequences described herein is contemplated. The flight management system as described automatically verifies, or can even replace, pilot calculations based on measurements of various systems and information provided over datalinks. The flight management system is capable of checking that the aircraft is in the correct configuration. During the takeoff sequence, the system monitors performance against expectation in the calculation and is capable of recalculating to decide if a higher thrust allows safe takeoff or if the takeoff sequence needs to be aborted.

Takeoff sequencing is a complex problem as weather/environment factors need to be considered (altitude, wind, temperature, slip coefficient of runway) as well as aircraft weight and balance and tested against runway parameters (direction, incline, length). Benefits associated with the methods and apparatus described herein include consideration of the flap and thrust settings as well as the decision, control, and takeoff velocities speed. Because errors in calculation can result in failure, it is vital to automate the calculations with as many variable input considerations as possible. Pilots can make calculation errors based on false assumptions (weight and balance wrong, slip coefficient wrong) or configuration settings (thrust or flap settings incorrect). For fuel saving, engine life, and noise abatement, maximum thrust is not normally applied during a takeoff sequence and instead an "optimal thrust profile" is applied. If a pilot detects problems too late in the takeoff sequence, the pilot may not be able to simply select maximum thrust and continue safe takeoff. The system described herein provides at least an automated check for the pilot. It is also contemplated that the flight management system described herein automatically increases thrust in an event where the real-time takeoff sequence is not within the predetermined parameter associated with the optimal takeoff sequence.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method of real-time analyzing, with a flight management systems (FMS) of an aircraft, a takeoff sequence of the aircraft on a predetermined runway, the method comprising receiving at the FMS, from sensors on the aircraft, real-time data corresponding to at least one variable influencing a takeoff reference velocity of the aircraft during the takeoff sequence, receiving at the FMS, from sensors on the aircraft, real-time data of an actual velocity of the aircraft and a real-time acceleration of the aircraft, estimating, with the FMS, a final estimated velocity based on the actual velocity and the real-time acceleration, comparing, with the FMS, the final estimated velocity to the takeoff reference velocity to determine if the final estimated velocity is within a predetermined range of the takeoff reference velocity; and altering, with the FMS, at least one operational variable of the aircraft when the comparing indicates the final estimated velocity is not within the predetermined range.

2. The method of any of the preceding claims, further comprising calculating the takeoff reference velocity with the FMS.

3. The method of any of the preceding claims, wherein calculating the takeoff reference velocity comprises determining a decision velocity associated with a velocity at which the aircraft is capable of braking without overrunning the predetermined runway.

4. The method of any of the preceding claims, wherein calculating a takeoff reference velocity comprises determining a rotation velocity associated with a velocity at which the aircraft is rotated for takeoff.

5. The method of any of the preceding claims, wherein calculating the takeoff reference velocity comprises determining a takeoff velocity associated with a velocity to ensure lift of the aircraft from the predetermined runway.

6. The method of any of the preceding claims, wherein receiving real-time data corresponding to at least one variable influencing a takeoff reference velocity of the aircraft during the takeoff sequence comprises receiving real-time aircraft variables and real-time condition variables.

7. The method of any of the preceding claims, further comprising storing the real-time aircraft variables as at least one of a weight value, balance value, pressure altitude value, temperature value, and flap/slat configuration value.

8. The method of any of the preceding claims, further comprising storing the real-time condition variables as at least one of a runway coefficient, wind speed, wind direction, temperature value, and pressure value.

9. The method of any of the preceding claims, further comprising aborting the takeoff sequence in an event where the actual velocity is outside the predetermined range of the takeoff reference velocity.

10. The method of any of the preceding claims, further comprising recalculating the takeoff reference velocity based on updated variables in an event where the actual velocity is outside the predetermined range of the takeoff reference velocity.

11. The method of any of the preceding claims, wherein altering at least one operational variable of the aircraft when the comparing indicates the final estimated velocity is not within the predetermined range comprises at least one of increasing thrust, adjusting a flap mounted to the aircraft, or adjusting a slat mounted to the aircraft.

12. The method of any of the preceding claims, further comprising processing a takeoff sequence check.

13. The method of any of the preceding claims, further comprising calculating an optimal take off sequence.

14. The method of any of the preceding claims, further comprising determining if an Engineered Material Arresting System is present on the predetermined runway.

15. The method of any of the preceding claims, wherein the FMS sends a signal indicating when the actual velocity is equal to the takeoff reference velocity.

16. An aircraft flight management system configured to analyze a takeoff sequence for an aircraft, the aircraft flight management system comprising memory storing runway information associated with the runway from which the aircraft will depart, one or more inputs configured to receive variables comprising real-time aircraft variables and real-time condition variables that influence an actual velocity of the aircraft, sensors for sensing the actual velocity of the aircraft, and a processor configured to calculate a takeoff reference velocity associated with the runway information, the real-time aircraft variables, and the real-time condition variables, calculate a real-time takeoff value associated with the actual velocity and the runway information, calculate a takeoff requirement value associated with the takeoff reference velocity; and compare the real-time takeoff value to the takeoff requirement value.

17. The aircraft flight management system of any of the preceding claims further comprising a control and display unit.

18. The aircraft flight management system of any of the preceding claims further comprising a throttle control.

19. The aircraft flight management system of any of the preceding claims wherein the sensors include an inertial sensor.

20. The aircraft flight management system of any of the preceding claims further comprising aircraft at least one of or both flaps and slats mounted to the aircraft.

What is claimed is:

1. A method of real-time analyzing, with a flight management system (FMS) of an aircraft, a takeoff sequence of the aircraft on a predetermined runway, the method comprising:
   receiving at the FMS, from sensors on the aircraft, a real-time actual velocity of the aircraft and a real-time actual acceleration of the aircraft;
   estimating, using the FMS, a final estimated velocity based on the real-time actual velocity of the aircraft and the real-time actual acceleration of the aircraft wherein the final estimated velocity is a calculated estimated value of the velocity of the aircraft that occurs in the takeoff sequence;
   receiving at the FMS a set of real-time aircraft variables associated with the aircraft and a set of real-time condition variables associated with an environment in which the aircraft is located;
   calculating a takeoff reference velocity with the FMS using at least one of the real-time aircraft variables and the real-time condition variables, where the takeoff reference velocity represents a calculated value of the actual velocity of the aircraft at a given time based on the received set of real-time aircraft variables and the received set of real-time condition variables;
   comparing, using the FMS, the final estimated velocity to the takeoff reference velocity;

determining, using the FMS, if the final estimated velocity is within a predetermined range of the takeoff reference velocity; and altering, using the FMS, at least one of a thrust, adjusting a flap mounted to the aircraft, or adjusting a slat mounted to the aircraft when the determining indicates that the final estimated velocity is not within the predetermined range.

2. The method of claim 1, wherein calculating the takeoff reference velocity comprises determining a decision velocity associated with a velocity at which the aircraft is capable of braking without overrunning the predetermined runway.

3. The method of claim 2, wherein calculating the takeoff reference velocity comprises determining a rotation velocity associated with a velocity at which a rotation of the aircraft departs from a runway during the takeoff sequence.

4. The method of claim 3, wherein calculating the takeoff reference velocity comprises determining a takeoff velocity associated with a minimum takeoff safety speed, a velocity at which the aircraft achieves lift from the predetermined runway.

5. The method of claim 1, further comprising storing the set of real-time aircraft variables as at least one of a weight value, balance value, pressure altitude value, temperature value, and flap/slat configuration value.

6. The method of claim 1, further comprising storing the set of real-time condition variables as at least one of a runway coefficient, wind speed, wind direction, temperature value, and pressure value.

7. The method of claim 1, further comprising aborting the takeoff sequence when a velocity is outside the predetermined range of the takeoff reference velocity.

8. The method of claim 1, further comprising recalculating the takeoff reference velocity with the FMS based on updated variables received at the FMS when a velocity is outside the predetermined range of the takeoff reference velocity.

9. The method of claim 1, further comprising processing a takeoff sequence check.

10. The method of claim 1, further comprising determining if an Engineered Material Arresting System is present on the predetermined runway.

11. The method of claim 1, wherein the FMS sends a signal indicating when an actual velocity is equal to the takeoff reference velocity.

12. The method of claim 1, wherein altering, further comprises altering, using the FMS, at least one of adjusting a flap mounted to the aircraft or adjusting a slat mounted to the aircraft when the determining indicates that the final estimated velocity is not within the predetermined range.

13. An aircraft flight management system for analyzing a takeoff sequence for an aircraft, the aircraft flight management system comprising:

memory storing runway information associated with the runway from which the aircraft will depart;

sensors configured to sense a real-time actual velocity and a real-time actual acceleration of the aircraft;

an onboard computer processor configured to:
receive the real-time actual velocity and a real-time actual acceleration of the aircraft;

collect a set of real-time aircraft variables associated with the aircraft and a set of real-time condition variables associated with an environment in which the aircraft is located;

calculate values including: a takeoff reference velocity associated with the runway information, a real-time takeoff value associated with the real-time actual velocity and the runway information, and a takeoff requirement value associated with the takeoff reference velocity;

determine if the real-time takeoff value is within a predetermined range of the takeoff requirement value; and alter at least one of increasing a thrust, adjusting a flap mounted to the aircraft, or adjusting a slat mounted to the aircraft when the real-time takeoff value is not within the predetermined range.

14. The aircraft flight management system of claim 13 further comprising a control and display unit.

15. The aircraft flight management system of claim 13 further comprising a throttle control.

16. The aircraft flight management system of claim 13 further comprising sensors including an inertial sensor.

17. The aircraft flight management system of claim 13 further comprising aircraft at least one of or both flaps and slats mounted to the aircraft.

* * * * *